No. 609,364.  
I. OLMSTED.  
PINKING SCISSORS.  
(Application filed Jan. 19, 1897.)  
Patented Aug. 16, 1898.

(No Model.)

Witnesses  
James F. Duhamel.  
Victor J. Evans.

Inventor,  
IDA OLMSTED.  
By John Wedderburn  
Attorney

UNITED STATES PATENT OFFICE.

IDA OLMSTED, OF DENVER, COLORADO.

PINKING-SCISSORS.

SPECIFICATION forming part of Letters Patent No. 609,364, dated August 16, 1898.

Application filed January 19, 1897. Serial No. 619,739. (No model.)

*To all whom it may concern:*

Be it known that I, IDA OLMSTED, a citizen of the United States, residing at Denver, in the county of Arapahoe and State of Colorado, have invented certain new and useful Improvements in Pinking-Scissors; and I do hereby declare the following to be a full, clear, and exact description of the invention, such as will enable others skilled in the art to which it appertains to make and use the same.

The invention relates to an improvement in pinking scissors or shears; and it consists in a novel construction and arrangement of the parts of the shears, comprising pivoted handles and approximately semicircular pinking-blades secured to said handles midway between their ends and on their convex sides, said blades being formed from strips of corrugated metal forming blades zigzag in form in longitudinal section and projecting from the handles on their adjacent sides and one blade adapted to pass its projecting cutting edge within the projecting cutting edge of the other in shearing relation thereto, as will be understood from the following description and claim.

Figure 1:
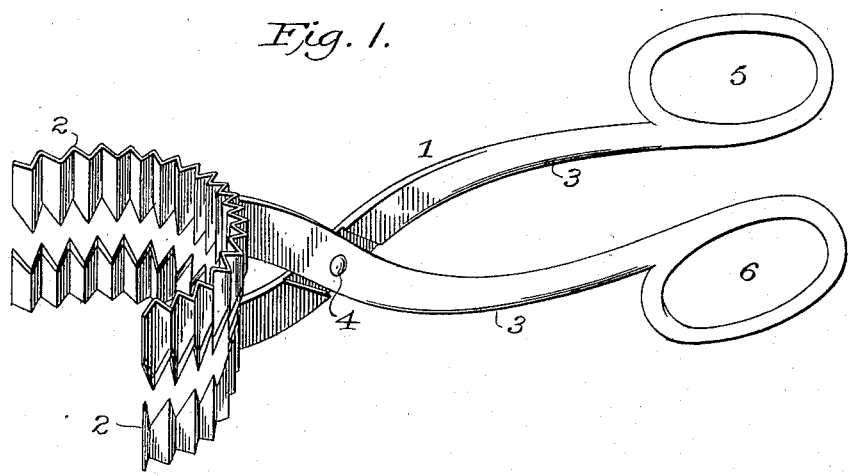
Figure 2:
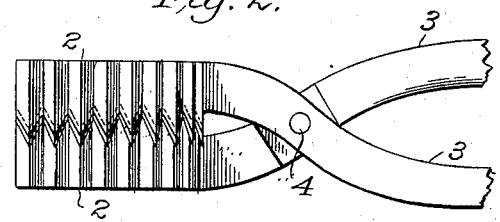
Figure 3:
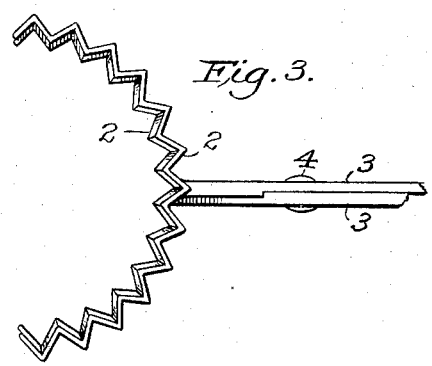

In the accompanying drawings, Figure 1 represents a perspective view of a pair of pinking-scissors embodying the invention. Fig. 2 represents the same in side elevation. Fig. 3 represents the parts in edge elevation, showing the zigzag form of the blades and the arrangement thereof whereby one is adapted to pass within the other.

1 indicates the scissors proper, and 2 2 the pinking-blades. The handles are of ordinary construction and comprise two arms 3 3, pivoted together at 4 and provided with the usual finger and thumb loops 5 and 6. The pinking-blades, which are approximately semicircular in form, are secured to the respective operating ends of the arms 3 3 and have their adjacent cutting edges serrated or scalloped, as indicated in the drawings. These blades are formed of strips of corrugated metal, giving them a zigzag form extending from end to end thereof, as indicated in the drawings, Figs. 1 and 2. They are secured on their convex faces, midway between their ends, to the handles and project on their adjacent faces sufficiently beyond the handles to adapt one of the blades to pass within the other in shearing relation thereto, the external diameter of one blade matching closely the internal diameter of the other blade, as shown. The construction of the blades is such that when the arms to which they are attached are brought together the serrated cutting edges of one blade will meet and pass by those of the other, thus cutting any material between them with a plurality of serrations due to the zigzag or corrugated form of the blades.

By the employment of the scissors constructed as described the edge of a garment may be pinked in a very short time by simply clipping said edge, so as to form one semicircular series of serrations adjoining the preceding one.

I do not care to limit myself to the exact construction of the serrations nor to the particular size of the corrugations of the blade, as these may be varied as desired; nor do I wish to limit myself to the manner of attaching the cutting-blades to the ends of the pivoted arms, as said blades may be cast integral with the arms or otherwise connected therewith in any suitable manner.

Having thus described my invention, what I claim as new, and desire to secure by Letters Patent, is—

As an improved article of manufacture, pinking-shears comprising pivoted handles, and approximately semicircular pinking-blades secured midway between their ends and on their convex sides to said handles, each blade comprising a strip of corrugated metal and forming a blade zigzag in form in longitudinal section, said blades projecting from the handles on their adjacent sides, and one adapted to pass its projecting edge within the projecting edge of the other, in shearing relation thereto, substantially as described.

In testimony whereof I have signed this specification in the presence of two subscribing witnesses.

IDA OLMSTED.

Witnesses:
EPHRAIM K. HUTCHISON,
BEN B. LINDSEY.